(12) United States Patent
Watson

(10) Patent No.: US 7,741,109 B2
(45) Date of Patent: Jun. 22, 2010

(54) METHOD FOR APPLYING LIVE BACTERIA LIQUID PRODUCT

(76) Inventor: James B. Watson, Route 1, Box 503, Pierce, NE (US) 68767

( * ) Notice: Subject to any disclaimer, the term of this patent is extended or adjusted under 35 U.S.C. 154(b) by 1107 days.

(21) Appl. No.: 10/858,762

(22) Filed: Jun. 2, 2004

(65) Prior Publication Data

US 2007/0269884 A1 Nov. 22, 2007

(51) Int. Cl.
*C12M 3/00* (2006.01)
*C12M 1/26* (2006.01)
(52) U.S. Cl. .............. 435/309.1; 435/252.1; 435/252.9; 435/253.6; 71/1; 71/7
(58) Field of Classification Search .............. 435/309.1, 435/243, 251.1, 252.9–253.6, 267; 424/234.1, 424/93.4; 128/200.15; 71/1–7
See application file for complete search history.

(56) References Cited

U.S. PATENT DOCUMENTS

| | | | | |
|---|---|---|---|---|
| 2,897,600 A | * | 8/1959 | Graham et al. ................. 34/667 |
| 3,982,920 A | * | 9/1976 | Cross et al. ...................... 71/1 |
| 4,161,397 A | * | 7/1979 | Bellet et al. ...................... 71/7 |
| 4,449,968 A | * | 5/1984 | Peterson ....................... 604/24 |
| 4,850,997 A | * | 7/1989 | DuBose ...................... 604/289 |
| 4,875,921 A | * | 10/1989 | Paau ................................. 71/7 |
| 5,505,193 A | * | 4/1996 | Ballini et al. .......... 128/200.15 |
| 5,916,029 A | * | 6/1999 | Smith et al. .................. 47/57.6 |
| 6,713,073 B1 | * | 3/2004 | Aehle ...................... 424/258.1 |

\* cited by examiner

*Primary Examiner*—Walter D Griffin
*Assistant Examiner*—Shanta G Doe
(74) *Attorney, Agent, or Firm*—Dennis L. Thomte; Thomte Patent Law Office LLC

(57) ABSTRACT

An applicator for applying a liquid carrier having live bacteria suspended therein, which are in a dormant state, to a target host comprising a pump having inlet and discharge sides, with the inlet side of the pump being in fluid communication with the liquid carrier. A first fluid conduit extends from the discharge side of the pump to an air induction nozzle which is in communication with a source of air under pressure. A flow control is imposed in the first conduit for adjusting the amount of liquid carrier passing therethrough. The pump and the air supply for the air induction nozzle are operatively connected to a power supply. The pump, when activated, causes the liquid carrier to be pumped to the air induction nozzle wherein the liquid carrier is mixed with air to create small droplets thereof for spraying onto the target host.

5 Claims, 1 Drawing Sheet

METHOD FOR APPLYING LIVE BACTERIA LIQUID PRODUCT

BACKGROUND OF THE INVENTION

1. Field of the Invention

This invention relates to a live bacteria liquid product applicator and more particularly to an applicator for applying a live bacteria product to a target host wherein live bacteria, that are in a dormant state, are suspended in a clear liquid fluid carrier.

2. Description of the Related Art

Live bacteria formulations are frequently applied to forage products or feed to enhance the forage product or feed. The prior art products fall generally into two categories which are either a dry soluble powder form or a dry granular non-soluble form. The dry granular products are directly applied to the forage through a metering device such as a Gandy box, usually at a rate of 4 to 16 ounces per ton of forage treated. The dry soluble products must first be hydrated with water, then applied to the forage within a 48-hour period post-hydration through a liquid pump system at the rate of 4 ounces to 1 gallon per ton of forage.

The dry granular products of the prior art, even if packaged in either paper bags or plastic pails, will sometimes come into direct contact with ambient air during manufacturing and processing or upon simply opening the product lid with the ambient air containing moisture or humidity. The moisture or humidity will activate the dormant bacteria upon contact which in turn causes the bacteria to inadvertently live and die before it can be applied to its target host. If so, the value of the product will then be a total loss. Limestone carriers of the prior art products also carry minute traces of moisture, and such moisture severely reduces the product's ability to sustain an adequate shelf life. If the prior art product is a soluble powder product, it will also need to be hydrated before application. The hydration immediately activates all of the dormant bacteria and the producer has to apply the entire mixture within a 48-hour time frame or before since the bacteria will naturally deplete its food source and die, creating a total loss of the product value.

Further, the prior art products on the market today must be either removed from their original shipping container and/or physically poured into a dry applicator prior to application, or they must be contaminated with water, reducing their shelf life to less than 48 hours, post-contamination. Additionally, the prior art dry granular products have a tendency of sorting during shipment. This shakes any fines to the bottom of the shipping container or applicator leaving the either larger or lighter material to work its way to the top. Since the bacteria attach themselves to these particles, they may also migrate with these particles. This situation usually also causes the product in an applicator to compact. Product compaction also causes applicator failure due to the lack of product flow. The prior art dry granular products also require a significant percentage of the product to be applied to the target host to increase its ability of uniform coverage. As the volumes or rates decrease to meet the product's needs, so does the product's ability of achieving a uniform coverage. Prior art rates are from 1/10th of a pound to 1 pound application rates. Other dry soluble powder products may settle to the bottom of the applicator tank upon hydration. This will depend greatly on the product's rate of dilution. As application rates decrease to meet the producer's ongoing needs of hauling less product to the field, the manufacturers must in turn make their products more condensed to meet the active ingredient needs. Such limits the solubility of the product.

Dry soluble powders mixed with water carriers have attempted to achieve low inclusion rates for some time. However, such products result in droplets which are very large in their molecular size and weight resulting in that there are actually few droplets being delivered per one ton of forage treated so uniform coverage is poor.

The applicators of the prior art suffer from many disadvantages. To the best of applicant's knowledge, the prior art applicators today are not able to apply a live bacteria product, such as described in applicant's co-pending application entitled "LIVE BACTERIA PRODUCT" filed May 25, 2004 (Ser. No. 10/853,346), to the target host which may be forage, feed, livestock, etc. One of the prior art applicators, after product rehydration, simply drips the active solution onto the forage. This applicator needs periodic cleaning and produces droplets that are very large in their molecular size and weight which means that there are actually very few droplets being delivered per one ton of forage, creating non-uniform coverage patterns. In another prior art applicator, after rehydrated product is pumped and sprayed through the applicator nozzles as product densities increase, product solubility decreases, causing settling of active ingredients. These applicators also require frequent cleaning of the same.

SUMMARY OF THE INVENTION

An applicator is provided for applying a liquid carrier having live bacteria suspended therein, which are in a dormant state, to a target host such as forage, feed, livestock, etc. The applicator apparatus comprises a pump having a positive fluid displacement, with an inlet and discharge sides with the inlet side of the pump being in fluid communication with the liquid carrier. A continuous fluid conduit extends from the product supply to the discharge side of the air injection nozzle means which is in communication with a source of air under pressure. A flow control means such as a flow meter is imposed on the first fluid conduit to permit the selective metering of the liquid carrier. A power supply is connected to the pump for selectively activating the pump. The pump, when activated, causes the liquid carrier to be pumped to the air induction nozzle means wherein the liquid carrier is mixed with air to create small droplets thereof for spraying onto the target host. In the preferred embodiment, the pump comprises a peristaltic pump. The liquid carrier is contained in a plastic bag, pail or drum. If the applicator apparatus is mounted on a chopper or harvester, an optional motion sensor or the like is provided which senses the absence of product being passed through the chopper and having the liquid carrier sprayed thereon and then deactivates the pump.

It is therefore a principal object of the invention to provide an improved applicator for applying a liquid carrier having live bacteria suspended therein, which are in a dormant state, to a target host such as forage, feed, livestock, etc.

A further object of the invention is to provide an applicator of the type described which forces air through the liquid carrier to create small droplets thereof for spraying onto the target host.

Still another object of the invention is to provide an applicator of the type described which requires little, if any, cleaning.

Still another object of the invention is to provide an applicator of the type described which may be mounted on a chopper, harvester or stationary feed mill applications, etc.

Yet another object of the invention is to provide an applicator that limits and protects the product from inadvertent product contamination right up to the point of actual product application onto its target host. The product only comes in physical contact with the fluid carrier hose and nozzle.

Still another object of the invention is to provide an applicator that is capable of applying very small amounts of product with maximum coverage with application rates of 1 to 37 grams of actual product delivered directly to its target host.

These and other objects will be apparent to those skilled in the art.

DETAILED DESCRIPTION OF THE INVENTION

Figure 1:
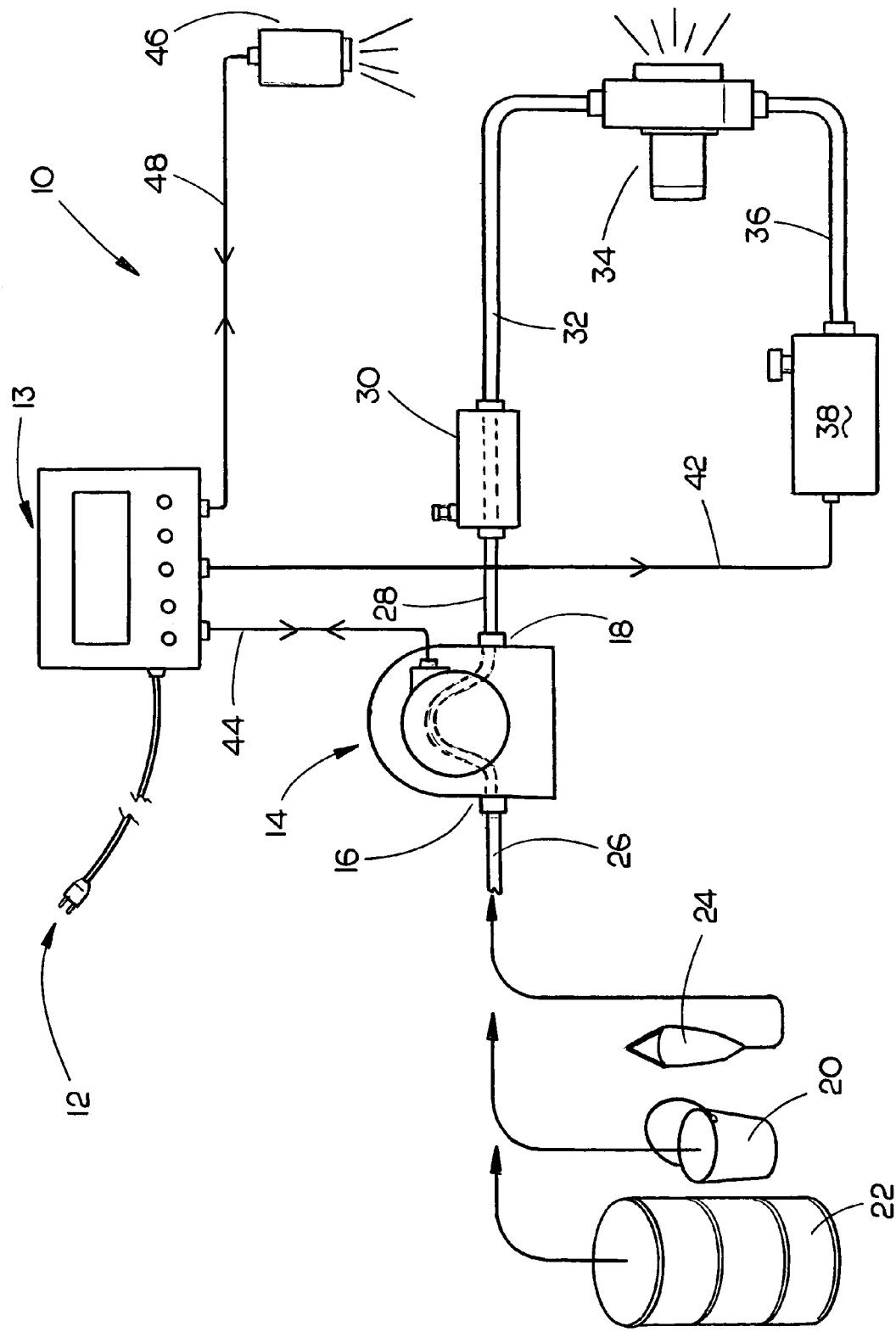
FIG. 1 is a schematic of the applicator of this invention.

Referring to FIG. 1, the numeral 10 refers generally to the applicator apparatus of this invention. The numeral 12 refers generally to a power supply which may be 9V, 12V, 24V or 115V. Power supply 12 is electrically connected to a control panel 13 which is electrically connected to a pump 14 which is preferably a peristaltic pump having an inlet side 16 and a discharge side 18. The inlet side 16 of pump 14 is in fluid communication with a source of live bacteria product contained in a five-gallon pail 20, a fifty-gallon drum 22 or a polyurethane bag 24 by means of conduit, hose or tube 26. The live bacteria product within the pail 20, drum 22 or bag 24 is of the type described in the co-pending application of applicant entitled "LIVE BACTERIA PRODUCT" filed May 25, 2004 (Ser. No. 10/853,346). The live bacteria product is comprised of mineral oil and polymers and is substantially moisture-free and which has the live bacteria, in a dormant state, suspended therein. If required, the liquid product may also have an adsorbent added thereto. The bacteria within the liquid product remain dormant until they come into contact with moisture from the target host.

Conduit, hose or tube 28 extends from the discharge side 18 of pump 14 to a selectively adjustable flow control means such as a flow meter 30 to permit the selective control of the amount of liquid product passing therethrough. Hose, conduit or tube 32 connects the flow control means 30 to an air induction nozzle means 34. Air induction nozzle means 34 has an air line 36 extending therefrom which is in communication with a source of air under pressure such as an air pump or an in-house supply hookup generally referred to by the reference numeral 38. If the applicator apparatus of this invention may be mounted on a forage chopper or forage harvester, the air supply to the air induction nozzle means 34 may be the on-board air compressor on the implement. The air supply 38 is electrically connected to the control panel 13 by wire(s) 42. The control panel 43 is also connected to the pump 14 by wire(s) 44.

If the applicator apparatus of this invention is mounted on a forage chopper or forage harvester, it is preferred that a motion sensor 46 be provided which is electrically connected to the panel 43 by wire(s) 48. The motion sensor 46 will sense the presence of material passing adjacent the air induction nozzle means 34 and when the motion sensor 46 detects an absence of such material passing by the air induction nozzle means 34, the sensor 46 will deactivate the pump 14 to interrupt the supply of liquid product being supplied to the air induction nozzle means 34. Motion sensor 46 is of conventional design and may be of the infrared type, etc.

In use, the hose 26 is connected to the interior of the pail 20, drum 22 or bag 24 so that the liquid live bacteria product is supplied to the pump 14 which pumps the product through the calibrated flow control means 30 to the air induction nozzle means 34. The air induction nozzle means 34 causes the liquid product to be broken up into very small droplets which are sprayed onto the target host. The moisture and pH associated with the target host will then activate the live bacteria.

There are many advantages to the applicator apparatus of this invention. The applicator of this invention does not require a reservoir since the product to be applied through the applicator is in a ready-to-use form and is provided in pail form, drum form or bag form. The applicator of this invention does not require any hydrating or mixing prior to use since the liquid product supplied thereto is in a stable homogenous, ready-to-use state. The applicator uses the assistance of the air induction nozzle means 34 with the addition of auxiliary air reducing the otherwise very large product droplets to thousands of very small droplets thereby providing maximum product coverage, with a micro-application rate. As stated, the products that are to be used in the applicator of this invention are all live dormant stable bacteria. Since the product is not activated in a reservoir, line, pump or nozzle, periodic cleaning of the applicator is virtually eliminated.

Thus it can be seen that the invention accomplishes at least all of its stated objectives.

I claim:

1. The method of applying a dormant live bacteria product to a target host, comprising the steps of:
    suspending a dormant viable harmless bacteria in a substantially moisture-free liquid carrier to form an admixture;
    placing the admixture into a container so that the admixture, while in the container, is not subjected to ambient air or moisture;
    providing a liquid pump having an inlet side and a discharge side;
    placing the inlet side of the liquid pump in communication with the admixture in the container;
    providing an air induction nozzle means having an inlet side and a discharge side;
    placing the discharge side of the liquid pump in communication with the inlet side of the air induction nozzle means;
    operating the liquid pump so that the admixture is delivered to the air induction nozzle means in large-product droplets from the container without bringing the admixture into contact with ambient air or moisture;
    operating the air induction nozzle means so that the air induction nozzle means causes the large-product droplets of the admixture to be broken up into small droplets which are sprayed onto the target host so that the moisture associated with the target host will activate the dormant bacteria.

2. The method of claim 1 wherein the liquid carrier comprises mineral oil and polymers.

3. The method of claim 1 wherein the liquid carrier comprises mineral oil, polymers and an absorbent material.

4. The method of claim 1 wherein the liquid carrier consists of mineral oil and polymers.

5. The method of claim 1 wherein the liquid carrier consists of mineral oil, polymers and an adsorbent material.

* * * * *